Sept. 29, 1931. E. L. JONES 1,824,899
RECEPTACLE FILLING APPARATUS
Filed Nov. 19, 1929   2 Sheets-Sheet 1
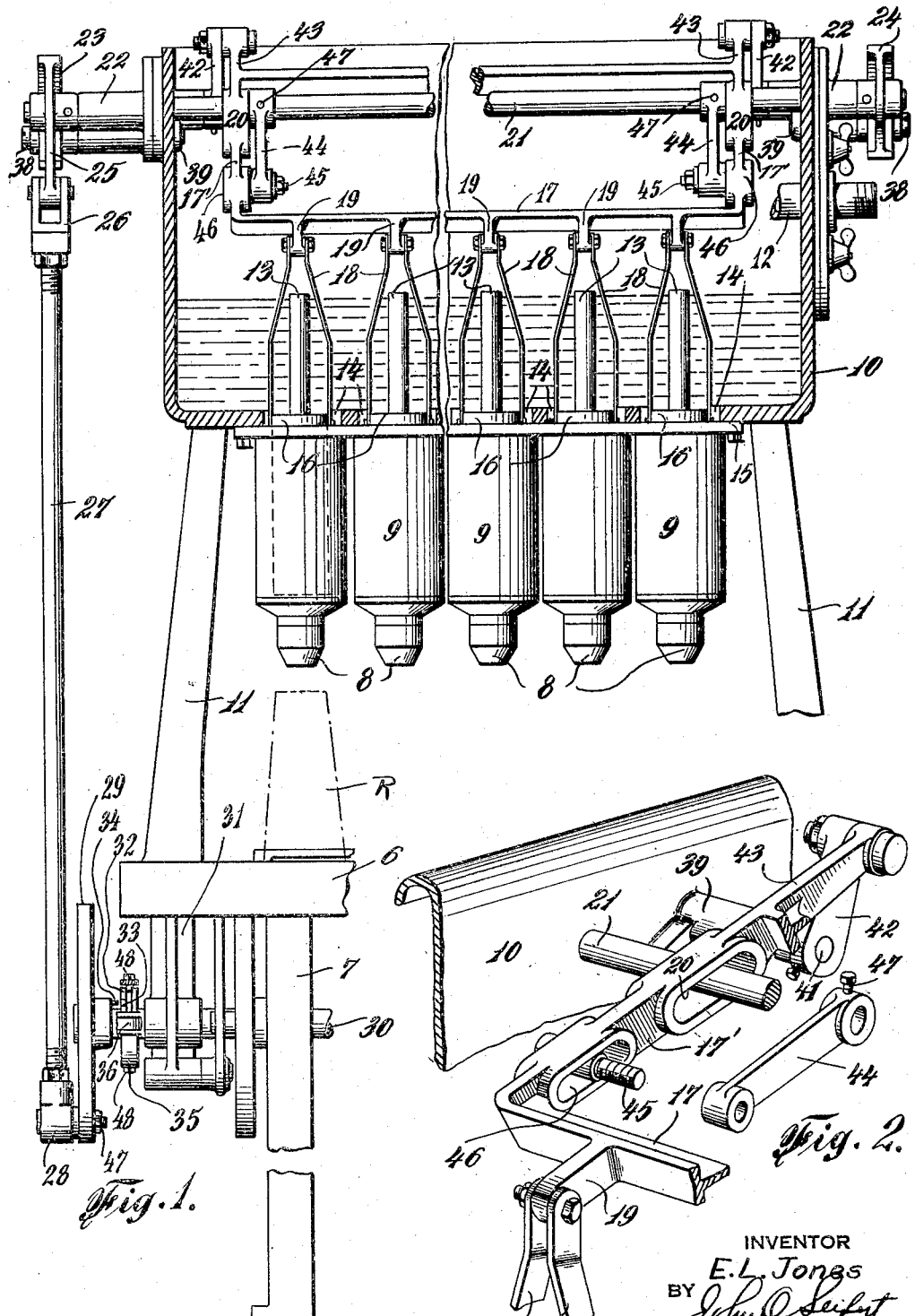
INVENTOR
E. L. Jones
BY
ATTORNEY Sept. 29, 1931.   E. L. JONES   1,824,899
RECEPTACLE FILLING APPARATUS
Filed Nov. 19, 1929   2 Sheets-Sheet 2
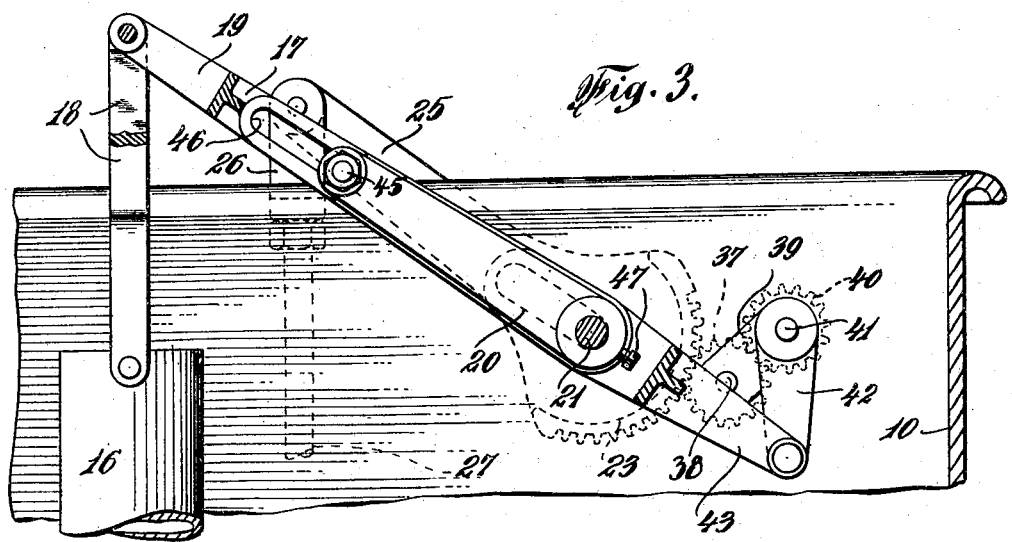
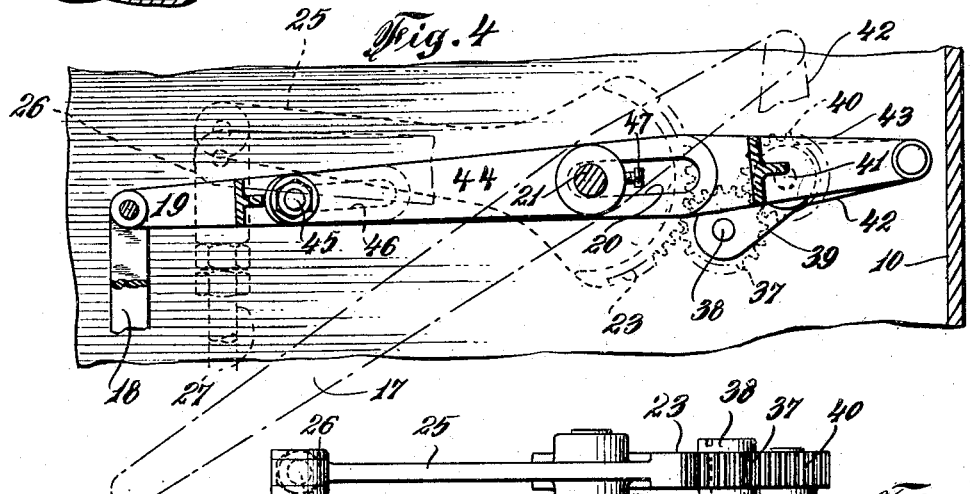
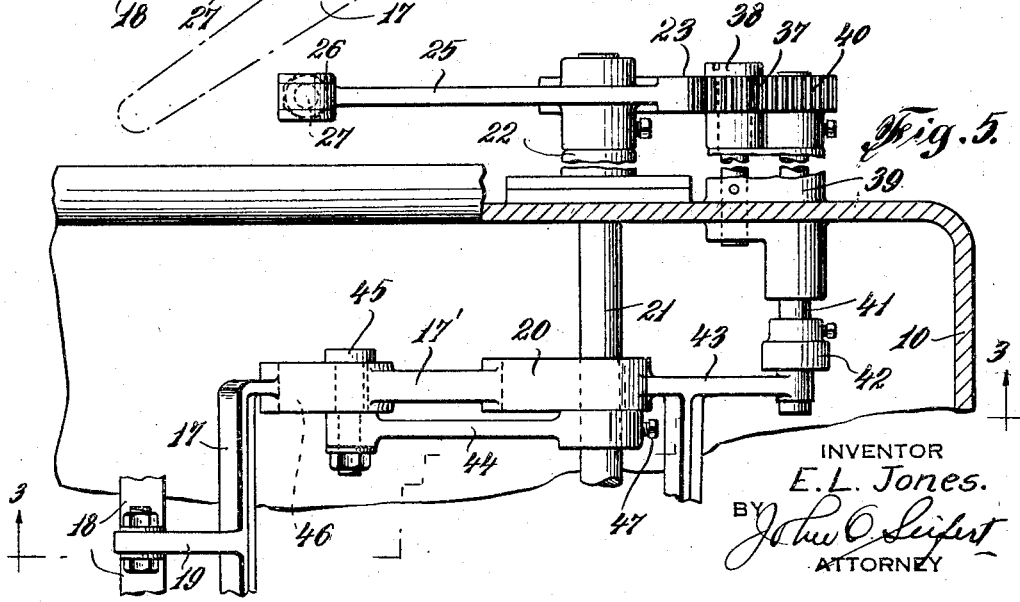
INVENTOR
E. L. Jones.
BY
ATTORNEY Patented Sept. 29, 1931

1,824,899

UNITED STATES PATENT OFFICE

ELLIS L. JONES, OF LONG ISLAND CITY, NEW YORK, ASSIGNOR, BY MESNE ASSIGNMENTS, TO AMERICAN SEALCONE CORPORATION, OF NEW YORK, N. Y., A CORPORATION OF NEW YORK

RECEPTACLE FILLING APPARATUS

Application filed November 19, 1929. Serial No. 408,232.

This invention relates to apparatus for filling receptacles with a predetermined quantity of liquid, and particularly to apparatus of this character as disclosed by Patent #1,521,843 issued to Irving Stanley, January 6, 1925, wherein a measuring device, termed a dipper is slidably mounted on an outlet tube opening through the bottom of a cylindrical member extended from and open to the bottom of a liquid carrying tank, said tube being extended above the normal liquid level in the tank and the measuring device is moved downward on the tube into the cylindrical member to be filled with the liquid from the tank and then moved upward on the tube to deliver the liquid from the measuring device into the top of the tube and discharged into a receptacle positioned relative to the outlet of the tube. In the operation of the means to reciprocate or move the measuring device along the discharge tube a lateral stress is exerted thereon and the mounting therefor on the tube resulting in undue wearing of the parts and consequent leakage and the rendering of the measuring device incapable of delivering a predetermined quantity.

It is the object of the present invention to overcome this disadvantage and to provide means to actuate the measuring device or dipper by a force exerted thereon in a vertical direction or in the plane of the outlet tube without the exerting of lateral stress and strain on the measuring device or dipper or the mounting therefor.

Other objects and advantages will hereinafter appear.

In the embodiment of the invention illustrated there is provided a liquid containing tank arranged with outlet tubes mounted in outlet nozzles fixed in a series in the bottom of the tank with the tubes extending into the tank above the liquid level which is maintained by a predetermined quantity of liquid delivered by a conduit having the outlet thereof to the tank controlled by a float actuated valve. A predetermined quantity of liquid sufficient to fill the receptacles is delivered to the tube entrances by measuring devices, herein termed "dippers" slidably mounted on the tubes and actuated upon the tubes to position the dippers below the liquid level in the tank remote from the tube entrances, and in a position relative to the tube entrances and out of communication with the liquid in the tank to deliver the liquid from the dippers to the tubes, by a pair of links pivotally connected to the dippers and portions of a frame member loosely mounted on a rock shaft to have movement about the axis and transversely of said shaft. The frame and rock shaft are operatively connected to reciprocate the dippers vertically with the point of connection between the frame and links, as well as the links, travelling in a vertical plane by sector gears fixed to the rock shaft, one of said gears being connected by a rod to a drive shaft through a crank and clutch connection to actuate the rock shaft. Both sector gears mesh with a gear of a pair of meshing gears rotatably mounted on the tank, arms participating in the movement of the other gears of said pairs of gears being connected to the frame member and transmitting the movement thereof to move the frame about and transversely of the rock shaft. Arms fixed to the rock shaft to extend parallel with the frame member have a slidable connection with the frame to transmit the movement of the shaft to the frame and permit of movement of the frame transversely of the rock shaft and in a direction longitudinally of said arms.

In the drawings accompanying and forming a part of this application, Figure 1 is a fragmentary elevational view of the apparatus showing the parts essential to the carrying out of the invention.

Figure 2 is a perspective view of the mounting of the frame member with part of the frame member broken away.

Figure 3 is a view taken on the line 3—3 of Figure 5 looking in the direction of the arrows to show the mounting of the frame member and actuating means therefor and showing the same in liquid delivering position.

Figure 4 is a view similar to Figure 3 showing the frame in an intermediate position; and Figure 5 is a plan view of the mounting of the frame member and actuating means therefor looking at the top of Figure 3.

In carrying out the invention there is provided a table 6 supported by standards 7 and arranged with means to position empty receptacles R upon the table in register with openings in nozzle outlets 8 releasably carried by cylindrical members 9 suspended in a series from and in communication with the bottom of a tank 10 supported upon the table by standards 11, said tank carrying the liquid to be filled into the receptacles, and to which tank liquid is delivered from a source of supply through a conduit 12 having the outlet within the tank controlled with a float actuated valve (not shown) to regulate the flow of the liquid to the tank and maintain the liquid level below the entrances of tubes 13 in communication with the nozzles and extended up through the cylindrical members and openings 14 in the bottom of the tank. The cylindrical members are secured to the bottom of the tank in communication with the tank openings 14 by a plate 15 releasably carrying the cylindrical members and bolted to the bottom of the tank.

To deliver the liquid from the tank in successive predetermined quantity to fill receptacles positioned below the nozzles, measuring devices or dippers 16 of cylindrical form open at the top and having a bottom portion restricted and arranged with a bearing bore carrying packing to slidably mount the dippers on the tubes in liquid tight condition, are simultaneously filled with the liquid in the tank by positioning the same within the cylindrical members with the open end of the dippers below the liquid level, as shown in Figure 1, and then moved up the tubes to a position above and out of the cylindrical members with the bottom of the dippers adjacent the entrances of the tubes to deliver the entire contents of the dippers into the tubes and discharged through the tubes and nozzles to receptacles positioned on the table in line with the nozzles. The dippers are actuated on the tubes by a rectangular frame member 17 connected to the dipper by pairs of links 18 pivotally connected at one end thereof at opposite sides of and to the top of the dippers, and connected at the opposite end with perforated projections 19 extending from one side of the frame member in spaced relation to each other and in alinement with the center of the tank openings 14. The frame is mounted within the tank to have reciprocatory or rocking and longitudinal movement by arranging an elongated opening 20 in the end members 17' of the frame adjacent the side thereof opposite to the side arranged with the projections 19 to slidably engage a rock shaft 21 rotatably mounted in bearings 22 at the sides of the tank and to the rear of the tank openings 14 with the shaft ends extending exteriorly of the tank and having sector gears 23, 24 fixed thereon.

To actuate the rock shaft an arm 25 integral with and extended from sector gear 23 has a pivotal connection between the legs of a bifurcated member 26 adjustably mounted on one end of a rod 27 extending to below the table 6 to have a crank and clutch connection with a drive shaft 30 by a head 28 adjustably connected to the end of rod 27 and loosely engaging a headed stud 47 projecting laterally from and adjacent to the periphery of a disk 29 loosely mounted on the drive shaft 30 journaled in hangers 31 suspended from the table and connected to a suitable source of power, not shown. The disk 29 is operatively coupled to the drive shaft by a clutch comprising a disk 32 rotatable with and slidable on the drive shaft and having a recess 33 in the face thereof for the engagement of a pin 34 extending from the hub of the disk 29. The clutch disk 32 is actuated on the drive shaft by a lever, (not shown,) connected to strap members 35 extended about the periphery of the disk 32 and having pins 48 engaging a groove in said periphery, the ends of the straps opposite to the connection with the lever being pivotally mounted on the hanger 31, as at 36 in Figure 1.

To move the dippers on the tubes into the cylindrical members 9 to fill the same and then upward on the tubes to deliver the contents to the tubes without setting up forces which exert lateral stresses and strains and a binding action between the dippers and tube mountings, not only resulting in rendering the mountings loose permitting of leakage of the liquid from the joints between the tubes and nozzles, but also causing undue wear of the dipper mountings on the tubes and leakage of liquid from the dippers, the pivotal connections between the links 18 and frame projections 19 are moved in a vertical plane substantially coaxially of the dippers and tubes. This is effected by actuating the frame about the axis and transversely of the rock shaft through the provision of compensating means in the connection of the frame with the rock shaft, comprising gears 37 loosely mounted on headed studs 38 fixed in and extending from bosses 39 on the side walls of the tank. the gears 37 meshing with the sector gears 23, 24 and gears 40 fixed to shafts 41 rotatably mounted in the bosses 39 and extended into the tank and having crank arms 42 fixed thereon, said arms being pivotally connected to arms 43 extended from the frame end nearest the perforations 20. The gears 37, 40 are of the same diameter and the number of teeth therein equal the number of teeth in the sector gears 23, 24, but the length of movement in one direction of the rod 27 will move the sector arm 25 through an arc of 60 degrees and rotate the sector gears 23, 24 to such an extent that only half the number of teeth in the center of the sector gears will engage a corresponding number of the teeth of gears 37 thereby moving the gears 40 a half of a revolution actuating the arms 42 from one vertical position, as shown in Figure 1, to the other vertical position, as shown in Figure 3, travelling through an arc of 180 degrees and thus actuate the frame member transversely of the rock shaft. In the vertical position of the arms 42, as shown in Figure 1, the rod 27 is at the terminal of its downward movement and the end wall of the perforations 20 nearest the frame extensions 43 abut the rock shaft with the frame tilted and the pivotal connections between the links 18 and frame projections 19 intersecting the axis of the dippers, and the dippers in lowermost position in communication with the tank liquid. When the arms 42 extend in a horizontal plane or in the intermediate position of the rod 27, the end wall of the perforations 20 nearest the frame projections 19 abuts the rock shaft, as shown in Figure 4, and when the rod 27 is at the terminus of its upward movement the arms 42 are in the vertical position shown in Figure 3. with the end wall of the perforations 20 nearest the extensions 43 abutting the rock shaft, which is the same position as when the rod 27 is at the terminus of its downward movement, but the frame is tilted in the opposite direction with the pivotal connections between the links 18 and frame projections 19 uppermost and the dippers in position with all the liquid delivered to the entrances of the tubes. The arms 42 are of predetermined lengths and impart movement to the frame transversely to the axis of the rock shaft in predetermined ratio to the angular movement of the frame and thereby effects a vertical straight line movement of the pivotal connections of the frame with the dipper connecting links in conjunction with the angular movement of the frame.

To connect or couple the frame 17 with the rock shaft 21 to participate in the rocking movement of the shaft and permit of the movement of the frame transversely of said shaft, arms 44 fixed at one end on the shaft have a pin and slot connection with the frame, comprising headed pins 45 having reduced threaded ends extended through perforations in the arms and secured thereto by nuts threaded onto said ends. The pins slidably engage elongated openings 46 in the portions of the side members of the frame extending from the shaft opposite to the frame extensions 43, said openings being of a length slightly less than the length of the frame openings 20 to compensate for differences in the lengths of the arms 43 and 44. The arms 44 are adjustably secured to the rock shaft by set screws 47. By the connection of the arms 44 with the frame as described the frame will participate in the movement of the rock shaft and permit of the movement thereof transversely of the rock shaft transmitted thereto by the crank arms 42 without effecting any distortion of the frame due to the torque of the operating connection of the frame with the arms 44. By the connection of the compensating means between the shaft and the frame extensions 43 at one end of the frame there is a tendency of a drag on the movement of the frame due to the sliding movement thereof on the shaft and a resultant distortion of the frame. However, this is entirely overcome by the connection of the arms 44 with the portions of the side members of the frame extending opposite to the frame extensions 43.

Having thus described my invention, I claim:

1. In receptacle filling apparatus, a tank arranged with an outlet tube having the entrance thereto above the liquid level in the tank, a dipper slidable on the tube to deliver the liquid to the tube entrance, a rock shaft rotatably mounted in the tank, an open frame having slots in the end members thereof engaged by the shaft for mounting the frame on the shaft to have pivotal movement about the axis of the shaft and transversely of the shaft and connected to the dipper, and means connecting the shaft with the frame to transmit rotative movement and movement transversely of the shaft to the frame to actuate the dipper relative to the tube without lateral stress in said actuation.

2. In receptacle filling apparatus, a tank arranged with a series of outlet tubes having the entrances thereto above the liquid level in the tank, dippers slidable on the tubes to deliver the liquid from the tank to the tubes, a rock shaft rotatably mounted in the tank, an open frame arranged with slots in the end members engaged by the shaft for mounting the frame on the shaft to have pivotal movement about the axis of the shaft and transversely of the shaft, gearing driven from the shaft having a crank connection with the frame at one side thereof operative to effect movement of the frame transversely of the shaft by the rocking of the shaft, and arms fixed on the shaft having a slidable connection with the frame to transmit the movement of the shaft to the frame and permit of movement of the frame transversely of the shaft, said shaft and frame connections effecting movement longitudinally of the dippers without lateral stress in said movement.

3. Receptacle filling apparatus as claimed in claim 2, wherein the sliding connection of the arms fixed to shaft and frame comprises a pin fixed in and extending from the arms loosely engaging slots in the frame.

4. Receptacle filling apparatus as claimed in claim 1, wherein the means connecting the shaft and frame member comprises a sector gear fixed to the rock shaft, a gear meshing with the sector gear, a second gear meshing with the first gear, and a crank arm rotatable with the second gear connected to the frame.

5. In receptacle filling apparatus, a tank arranged with a series of outlet tubes having the entrances thereto above the liquid level in the tank, dippers slidable on the tubes to deliver a predetermined quantity of liquid from the tank to the tubes, a rock shaft rotatably mounted in the tank, a frame loosely carried by the shaft to participate in the movement of the shaft and have movement transversely of the shaft and connected to the dippers, means connecting the rock shaft with the frame to transmit the movement of the shaft to the frame and impart movement to the frame transversely of the shaft and effect movement of the dippers on the tubes without lateral stress, and means to rock the rock shaft comprising a drive shaft and a rod having crank connections with the drive and rock shafts.

6. Receptacle filling apparatus as claimed in claim 5, wherein the dippers are connected to one side of the frame and the means connecting the rock shaft with the frame to transmit movement to the frame transversely of the shaft, comprises sector gears fixed to the rock shaft, gearing driven from the sector gears, and crank connections between said gearing and the frame at the side opposite to the connection thereof with the dippers.

7. In receptacle filling apparatus, a tank arranged with a series of outlet tubes having the entrances thereto above the liquid level in the tank, dippers slidable on the tubes to deliver a predetermined quantity of liquid from the tank to the tubes, a rock shaft rotatably mounted in the tank to extend parallel to the outlet tubes, a rectangular open frame loosely carried by the shaft to have pivotal movement about the axis of the shaft and transversely of said shaft and connected to the dippers, and means connecting the shaft with the frame to transmit the rocking movement of the shaft to the frame and simultaneously impart movement to the frame transversely of the shaft in predetermined ratio to the rocking movement of the frame to effect movement of the connections of the frame with the dippers in a plane coaxially of the tubes and move the dippers on the tubes without imparting lateral stress to the dippers.

8. In receptacle filling apparatus, a tank arranged with a series of alined outlet tubes having the entrances thereto above the liquid level in the tank, dippers slidable on the tubes to deliver a predetermined quantity of liquid from the tank to the tubes, a rock shaft rotatably mounted in the tank to extend parallel to the line of outlet tubes with the ends extended exteriorly of the tank, a frame loosely carried by the shaft within the tank to have movement about the axis of the shaft and transversely of said shaft and connected to the dippers, sector gears fixed to the extended shaft ends, and pairs of meshing gears supported exteriorly of the tank with a gear of each pair of gears meshing with the sector gears and the other gears connected to the frame to impart reciprocatory movement to the frame transversely of the shaft, and means to couple the frame with the shaft to participate in the rocking movement of the shaft, and said movements of the frame effecting movement of the dippers relative to the tubes without lateral stress.

9. Receptacle filling apparatus as claimed in claim 8, wherein the connections of the one gear of the pair of gears to the frame comprises crank arms rotatable with said gears and pivotally connected to the frame.

Signed at New York city, in the county of New York and State of New York, this 7th day of November, A. D. 1929.

ELLIS L. JONES.